(12) United States Patent
Bullman et al.

(10) Patent No.: US 6,981,164 B2
(45) Date of Patent: Dec. 27, 2005

(54) LINK INTEGRITY DUALITY FOR NETWORK DEVICES IN COLD POWER STATE

(75) Inventors: William R. Bullman, Bethlehem, PA (US); Matthew Henry, Fogelsville, PA (US); Ryan S. Holmqvist, Basking Ridge, NJ (US); Steven E. Strauss, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 1020 days.

(21) Appl. No.: 09/760,752

(22) Filed: Jan. 17, 2001

(65) Prior Publication Data

US 2001/0049750 A1 Dec. 6, 2001

Related U.S. Application Data

(60) Provisional application No. 60/183,520, filed on Feb. 18, 2000.

(51) Int. Cl.[7] ............................. G06F 1/26; G06F 1/28; G06F 1/30
(52) U.S. Cl. ...................... 709/324; 713/323; 709/250; 455/574
(58) Field of Search ........................ 709/250; 713/300, 713/320, 323, 324; 455/574; 370/438, 227

(56) References Cited

U.S. PATENT DOCUMENTS

| | | | | |
|---|---|---|---|---|
| 5,283,905 A | * | 2/1994 | Saadeh et al. | 713/324 |
| 5,579,524 A | * | 11/1996 | Kikinis | 713/324 |
| 6,092,207 A | * | 7/2000 | Kolinski et al. | 713/323 |
| 6,105,096 A | * | 8/2000 | Martinelli et al. | 710/306 |
| 6,282,665 B1 | * | 8/2001 | Cruz | 713/324 |
| 6,282,666 B1 | * | 8/2001 | Bays et al. | 713/323 |
| 6,345,364 B1 | * | 2/2002 | Lee | 713/324 |
| 6,393,570 B1 | * | 5/2002 | Henderson et al. | 713/310 |
| 6,460,106 B1 | * | 10/2002 | Stufflebeam | 710/304 |
| 6,473,810 B1 | * | 10/2002 | Patel et al. | 710/7 |
| 6,510,524 B1 | * | 1/2003 | Osborn et al. | 713/323 |
| 6,523,073 B1 | * | 2/2003 | Kammer et al. | 710/48 |
| 6,606,712 B1 | * | 8/2003 | Miura | 713/320 |

(Continued)

OTHER PUBLICATIONS

Haartsen, J.C., "BluetoothTM: a new radio interface providing ubiquitous connectivity", 2000 IEEE 51st Vehicular Technology Conference Proceedings, Spring Tokyo, vol: 1, May 15-18, 2000, pp.: 107-111.*

*Primary Examiner*—Wilbert L. Starks, Jr.
*Assistant Examiner*—Crystal J Barnes

(57) ABSTRACT

A data-based software type link integrity module is implemented separately in hardware (e.g., using physical gates, using a microcontroller, etc.) and separated from core CPU functionality in a network device, such that the link integrity module may remain powered in a cold power mode (e.g., when core functionality is powered down). The separately powered data-based link integrity module is powered by an auxiliary backup power source. Thus, when in a power down mode (e.g., when in an ACPI defined D3 type cold state) a minimal power source may be used to power the separate link integrity module separate from the power source to the core network device functionality. The separately powered data-based link integrity module may be redundant to a software driver type data-based link integrity module implemented in core memory and enabled or disabled as desired. Alternatively, the separately powered data-based link integrity module may be in lei of the otherwise conventional software driver implemented in core memory and permanently enabled.

23 Claims, 5 Drawing Sheets

U.S. PATENT DOCUMENTS

| | | | |
|---|---|---|---|
| 6,654,614 B2 * | 11/2003 | Morris et al. | 455/426.1 |
| 6,654,890 B1 * | 11/2003 | Girard | 713/200 |
| 6,658,576 B1 * | 12/2003 | Lee | 713/320 |
| 6,751,676 B2 * | 6/2004 | Fukuhara | 709/250 |
| 6,795,926 B1 * | 9/2004 | Matula et al. | 713/300 |
| 6,822,764 B1 * | 11/2004 | Okabe et al. | 358/442 |
| 2001/0031626 A1 * | 10/2001 | Lindskog et al. | |
| 2002/0019966 A1 * | 2/2002 | Yagil et al. | |

* cited by examiner

LINK INTEGRITY DUALITY FOR NETWORK DEVICES IN COLD POWER STATE

The present invention claims priority from U.S. Provisional Application No. 60/183,520, entitled "Link Integrity Duality For In-Home Phoneline Networking Transceivers", by Bullman, Holmqvist, Henry and Strauss, filed Feb. 18, 2000, the entirety of which is expressly incorporated herein by reference.

BACKGROUND OF THE INVENTION

1. Field of the Invention

This invention is directed to the field of networks. More particularly, it relates to apparatus and techniques for network devices such as networks which utilize a data based link integrity protocol, e.g., In Home networks.

2. Background of Related Art

Networking, and in particular Home Networking (e.g., home phone line networking based on specifications from HomePNA™) is a new segment of the networking marketplace that is poised for rapid growth. However, achieving the goals needed to make home networking a market success is a challenging task. Nascent home networking market growth will depend on the emergence of high-speed broadband access as a catalyst as well as the availability of robust, low cost, easy to install standardized home networking equipment.

Networks may include many devices of various types (e.g., Ethernet, 802.11, HomePNA, BLUETOOTH, power line networks such as Homeplug™, etc.) and may or may not include wireless devices. Many network devices power down from time to time, depending upon the particular application. The health or presence of any particular network device is often determined using a link integrity function.

The purpose of any network link integrity function is to allow one network device to detect the health or presence of another network device. Events triggered by the receipt of a valid link integrity signal typically include, e.g., lighting an available system LED. The link integrity action is therefore very beneficial to a user, e.g., by providing a visual indication that the network is functioning properly. In a two-device network, a visual indication indicating a "good" network transitioning into an inactive state (not lit) due to one of the network devices entering a power conserving mode such as a D3 power down state is likely to lead to consumer confusion.

Initial link integrity functions utilized physically unique signaling on a wired line (e.g., Ethernet devices) to signal link integrity. However, in a growing number of network applications, link integrity is being handled in data based link integrity data packets transmitted over a communication link, instead of providing a unique electrical signal.

It is a general requirement of many such network devices to implement a link integrity function to ensure that, with high probability within some periodic interval, there is either (1) at least one link packet such as a link integrity control frame (LICF) sent to the Broadcast MAC address from the relevant station, or (2) at least one packet addressed to the Broadcast MAC address received from each of at least two other stations.

FIG. 5 shows a conventional data-based link integrity module incorporated within core memory of a network device, in accordance with the principles of the present invention.

In particular, as shown in FIG. 5, a network device 550 includes a core processor 502 (e.g., processor, microprocessor, or digital signal processor), core memory 504, a link interface 506, and a power mode control module 508 (which may alternatively be integrated within the core processor 502 and/or the core memory 504). As depicted in FIG. 5, the core memory 504 includes a driver or other implementation of a software link integrity module 510.

Using the data based link integrity techniques, a software driver is typically loaded into a processor (e.g., a core CPU) to handle link integrity functions, either in response to an external request, or to itself report its health and/or presence. The software driver technique determines whether or not a particular network device is able to receive frames from at least one other device on the network. In the absence of other traffic, the network device will periodically transmit, e.g., a Link Integrity Control Frame (LICF) to a Broadcast Media Access Control (MAC) address.

For instance, in the emerging Home Phoneline Network Alliance (HomePNA) Version 2.0 (V2) specification, link integrity is defined as a valid Ethernet packet-based approach periodically sent out in a defined frame format at a system negotiated encoding rate. Because system parameters can change as the quality of the channel changes, the encoding rate tends to be dynamic.

For instance, the Advance Configuration and Power Interface (ACPI) standard defines various power states that PC-centric devices must operate in, including a D3 cold state. In the D3 cold state, power is fully removed from the particular device at the system level. However, when power is removed, the device context is lost and thus no driver remains present.

Bound by this criteria, a link integrity function is easily performed by driver level code. However, the drivers must be maintained by the supporting network device for the link integrity function to be performed. Because of this, network devices using data based link integrity typically do not transition to a power down state.

Accordingly, link integrity is not supported in a network device which relies on data based link integrity functionality when the network device enters a D3 cold state. To support link integrity, such devices must first power up from the D3 cold state, first reinstalling the pertinent link integrity driver(s). Typically, to provide link integrity as many specifications require (e.g., HomePNA version 2.0), the D3 cold state in such devices is conventionally avoided.

The current method defined in the HomePNA V2 specification for link integrity is a packet-based approach sent at the highest priority class of service. A minimum payload encoding (PE) value is negotiated and each station is required to send out the link integrity packet with a determined packet format at this negotiated PE value.

While this conventional approach is adequate when the system is in a functional and fully operational state, problems exist during the ACPI-defined power down states. In the context of ACPI, a "fully operational state" is defined as a non-D3 power state. In the fully operational state, the device is completely active and responsive, and is expected to continuously retain all relevant context information. However, when in a D3 power state, power is fully removed from the device. Unfortunately, device context is lost when this non-powered state is entered, and thus any/all software drivers that were present will be lost. Thus, while in a non-powered or D3 state, network device context information such as data, software drivers, etc., are lost, and thus network devices in this state certainly do not decode their network address lines, causing problems with respect to conventional software based link integrity techniques. After power is returned to the network device, the operating system (OS) will be required to reinitialize the network device, and relevant drivers will be reloaded.

Network devices in a D3 type cold state will typically require a relatively long restart/restore time to return to a functional state capable of handling link integrity functions. Therefore, latency time is significant if a network device is to be woken up from a D3 type cold state to handle link integrity functions. This becomes problematic when a fully functional node in a network needs access to another device in the network that is currently in a D3 cold (i.e., unpowered) state.

There is a need for an approach that allows the provision of a link integrity function while a network device is in a D3 type cold state.

SUMMARY OF THE INVENTION

In accordance with the principles of the present invention, a network device comprises a core processor and core memory. A link integrity module is in communication with the core processor. The link integrity module is powered separately from the core processor and the core memory. The network device includes a D3 type cold power mode wherein the link integrity module maintains power.

A method of maintaining data-based link integrity in a powered down network device in accordance with another aspect of the present invention comprises providing a link integrity module powered separately from core functionality in the network device. Power is removed from the core functionality of the network device while power to the separately powered link integrity module is maintained.

A method of providing both physical and data-based link integrity capability in a network in accordance with yet another aspect of the present invention comprises determining if another network device in the network requires physical link integrity signaling. If another network device in the network requires physical link integrity signaling, a data-based link integrity packet is output in a physical link integrity mode. If no other network device in the network requires physical link integrity signaling, a data-based link integrity packet is output in a non-physical link integrity mode.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with the principles of the present invention, a data-based software type link integrity module is implemented separately in hardware (e.g., using physical gates, using a microcontroller, etc.) and separated from core CPU functionality in a network device, such that the link integrity module may remain powered in a cold power mode (e.g., when core functionality is powered down). The separately powered databased link integrity module is powered by an auxiliary backup power source (e.g., often referred to as $V_{aux}$ in PC centric applications). Thus, when in a power down mode (e.g., when in an ACPI defined D3 type cold state) a minimal D3 power source may be used to power the separate link integrity module separate from the power source to the core network device functionality.

In accordance with the principles of the present invention, the separately powered data-based link integrity module may be redundant to a software driver type data-based link integrity module implemented in core memory and enabled or disabled as desired. Alternatively, the separately powered data-based link integrity module may be in lieu of the otherwise conventional software driver implemented in core memory and permanently enabled.

While the present invention is described with reference to embodiments relating to Home Networking devices (e.g., to HomePNA™ network devices), the principles of the present invention relate equally to other networks that otherwise conventionally use driver or software data-based link integrity techniques which would otherwise become nonfunctional as a result of a system power down, e.g., D3 type cold state.

Figure 1:
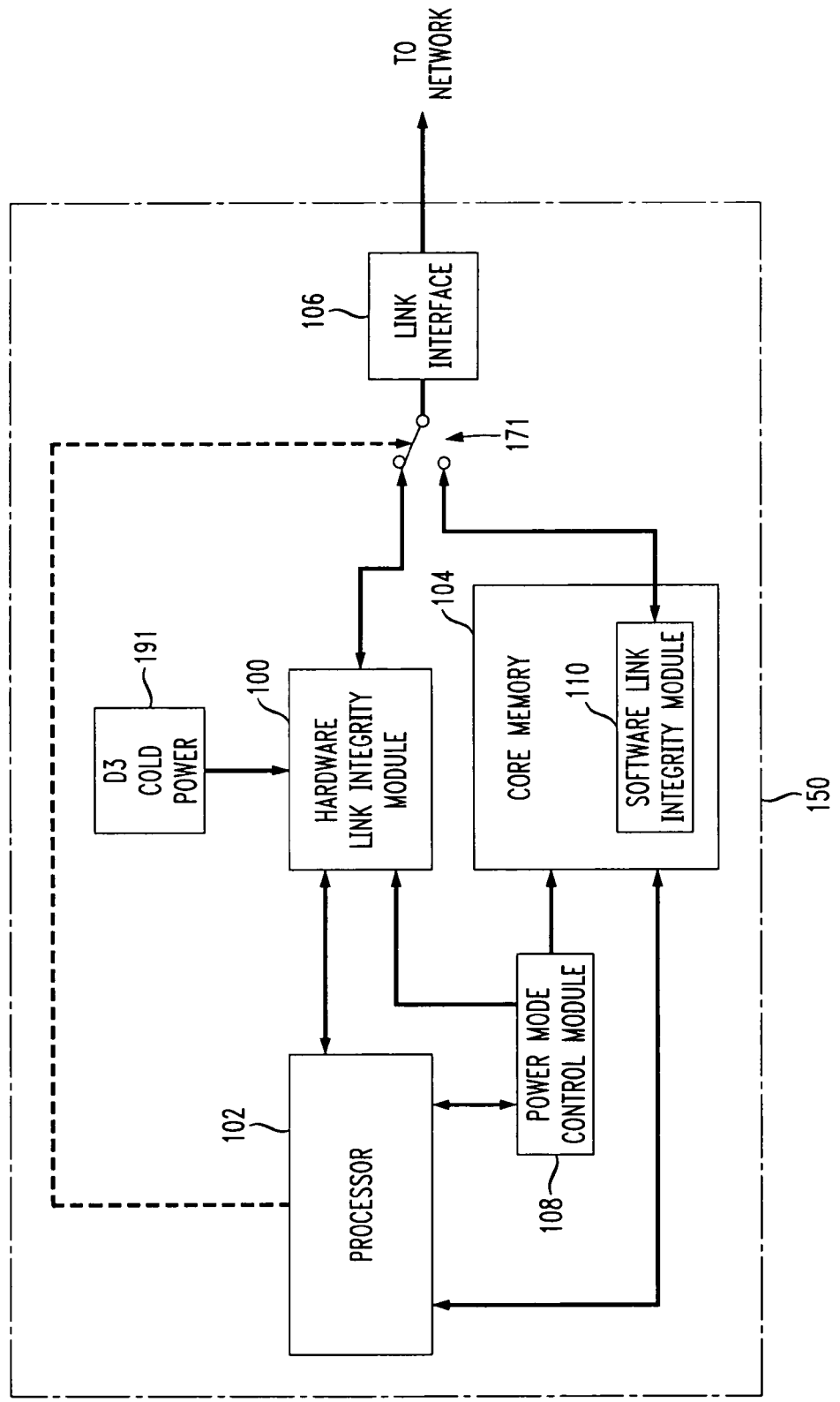
FIG. 1 shows a separately powered hardware link integrity module which remains powered when the network device is powered down, e.g., in a D3 type cold power state, as well as a software link integrity module in core memory which is lost during a power down, either of which are switched in as desired, in accordance with the principles of the present invention.

FIG. 1 shows a separately powered hardware link integrity module which remains powered when the network device is powered down, e.g., in a D3 type cold power state, as well as a software link integrity module in core memory which is lost during a power down, either of which are switched in as desired, in accordance with the principles of the present invention.

In particular, as shown in FIG. 1, a network device 150 such as a HomePNA™ network device includes a core processor 102 and core memory 104. The core processor 102 and core memory 104 may be integrated into a common device, or may be separate devices. The network device 150 further includes a link interface 106.

The core memory 104 of the first embodiment shown in FIG. 1 includes a software driver 110 having link integrity functionality. However, importantly, a hardware implementation 100 is also implemented. In the disclosed embodiment, either the hardware link integrity module 100 or the driver software link integrity module 110 is enabled (e.g., by the power mode control module or other suitable configuring device), and the enabled link integrity device 100 or 110 is functionally switched into operation (as depicted figuratively by switch 171).

'Hardware' implementation of the link integrity module 100 refers herein to a device which is separate in hardware from the core memory 104. The hardware link integrity module 100 may be formed from logic gates, a state machine, or even a separate processor (e.g., a low power microcontroller), so long as the hardware link integrity module 100 is powered separate from the core memory 104.

Thus, in accordance with the principles of the present invention, a separately powered hardware based link integrity module, either in addition to or in lieu of an otherwise conventional software driver based link integrity module, is implemented such that the separately powered hardware link integrity module maintains power during a D3 type cold state.

In FIG. 1, the hardware link integrity module 100 is shown as being permanently tied to D3 power, while the core memory is powered from a system power source through a power mode control module 108. When the network device 150 is powered down to a D3 type cold state, system power is removed from the core memory 104 (albeit after an arranged power down procedure has been performed), but the D3 power source remains. In this way, the hardware link integrity module 100 continues to provide link integrity information to other network devices over the link interface 106 while the remainder of the network device (e.g., the core processor 102, core memory 104, etc.) are powered down).

Thus, the hardware link integrity module 100 may be continuously powered by a backup power source such as a D3 power source 191. Alternatively, the hardware link integrity module 100 may be switchably powered from the system power source when the network device is fully functional (i.e., in a non-powered down mode) and switched to be powered from a backup power source when the network device is powered down. Preferably, but not necessarily, the switchover in power sources to the hardware link integrity module 100 is uninterrupted to minimize disruption to the network when the network device powers down and/or up.

The hardware link integrity module 100 and the software driver link integrity module 110 are each separately capable of determining whether or not the network device is able to receive frames from at least one other station on the network. In the absence of other traffic, the enabled link integrity module 100 or 110 periodically transmits a data-based link integrity signal, e.g., a Link Integrity Control Frame (LICF) to a Broadcast MAC address. The interval between such transmissions may be governed by a specification or standard.

Accordingly, wake up data (e.g., a pre-defined system wake up data packet) may be sent to a network device recognized to be in a powered down or un-powered state (e.g., in a D3 cold state). Otherwise, the Destination Address of the desired network device would need to be sent as in the formation of a "normal" packet (i.e., as if it were in a state other than in a powered down state).

Thus, using a separately powered and power-down enabled hardware link integrity module 100 in accordance with the principles of the present invention, networks and network devices are made to be more robust in a fully functional state. For instance, if a link integrity signal is not transmitted while a device is in a D3 type cold, un-powered state, other network devices on the network would otherwise assume that the network device is no longer functional and off the network (at least until re-powered through means other than data-based communications, which would not be possible in a powered down mode), and thus would not further attempt to access that particular network device.

In all power states other than the D3 cold power down state, link integrity may be handled by the software link integrity module 110, and the hardware link integrity module 100 may be disabled to conserve its power source (e.g., a backup D3 or auxiliary power source). Preferably, information is passed between the software link integrity module 110 and the hardware link integrity module 100 to allow for a smooth transition between handling of link integrity by the hardware link integrity module 100 during D3 type cold power down states, and handling of link integrity by the software link integrity module 110 during non-D3 type power down states.

In networks that are rate adaptive, e.g., HomePNA version 2.0, the link integrity modules 100 or 110 preferably has prior knowledge of the minimum accepted Payload Encoding value negotiated by all of the network devices currently residing on the network, and the link integrity data packet is preferably transmitted at this negotiated rate.

According to the disclosed embodiment in a HomePNA network, in the ACPI D3_Cold state, the hardware link integrity module 100 performs link integrity during this state. The valid packet data to be transmitted is preferably written into a packet buffer structure or holding register by the driver software link integrity module 110 prior to its being disabled in response to a D3 cold power down request. The hardware link integrity module 100 then preferably transmits this packet upon expiry of a link integrity timer. Link integrity information may be transmitted, for example, at the lowest common encoding rate. In a HomePNA application, it is beneficial to assume that link integrity is transmitted at an encoding rate of 2 bits/baud by network devices in D3 type cold power down or inactive states because the rate that is receivable by all network devices actively listening to a broadcast address may change during the course of being in this state. Furthermore, transmission at 2 bits/baud is beneficial as it may be the lowest common receive rate supported by all network devices actively listening on the network.

Figure 2:
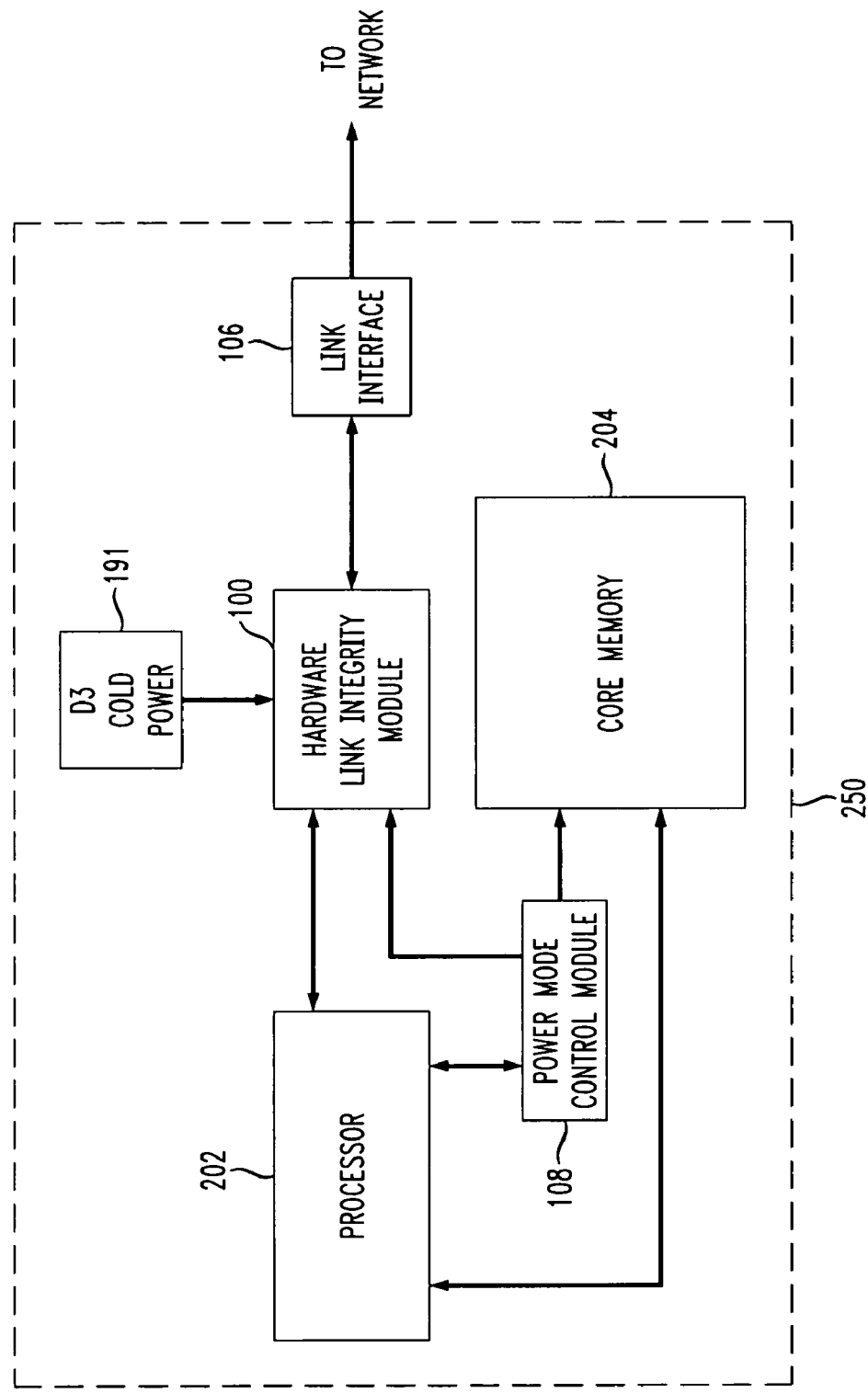
FIG. 2 is similar to FIG. 1 but shows implementation of only the separately powered hardware link integrity module which remains powered when the network device is powered down, in accordance with another embodiment of the present invention.

FIG. 2 is similar to FIG. 1 but shows implementation of only a separately powered hardware link integrity module 100 which remains powered when the network device is powered down, in accordance with another embodiment of the present invention.

In particular, as shown in FIG. 2, a processor 202 and core memory 204 are included, the driver software link integrity module 110 shown in FIG. 1 is eliminated, and a hardware link integrity module 100 is permanently enabled. While the hardware link integrity module 100 is shown as being permanently powered by D3 backup power, power to the hardware link integrity module 100 may be switched to system power when the network device 250 is in a non-powered down state.

Figure 3:
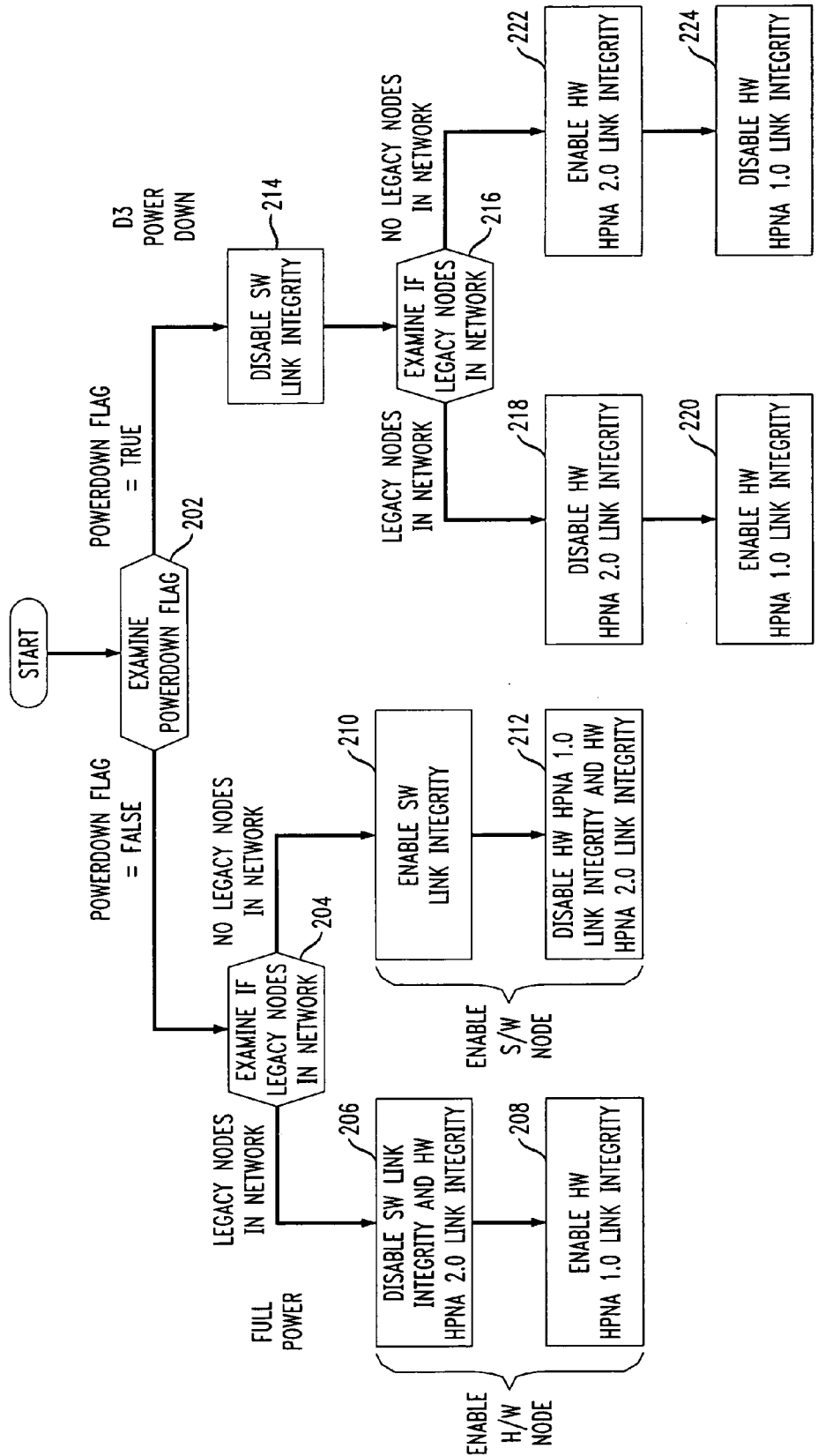
FIG. 3 is an exemplary system behavior state flow diagram of the embodiment shown in FIG. 1.

FIG. 3 is an exemplary system behavior state flow diagram of the embodiment shown in FIG. 1.

In particular, as shown in step 202 of FIG. 3, the D3 state is determined. If the network device 150 is in the process of going into a D3 power down state, then the process flows to step 214, which disables the software link integrity module 110. If, on the other hand, the network device 150 is not in a D3 type powered down state, the process flows to step 204.

Step 204 allows disabling of the hardware link integrity module 100 to provide otherwise conventional link integrity functionality from only the software link integrity module 110. This is accomplished by steps 210 and 212.

Step 206 disables the software-based link integrity as well as the hardware-based HPNA version 2.0 link integrity generator.

Step 208 also enables the HPNA version 1.0 link integrity generator.

On the other hand if the hardware link integrity module 100 is not to be enabled (e.g., otherwise conventional functionality is to be performed), the process flows to step 210 which enables the software link integrity module 110 and to step 212 which disables the hardware link integrity module 100.

In a HomePNA network, older legacy devices using physical link integrity signaling (e.g., HomePNA version 1.0) may exist together with newer devices using data-based link integrity signaling (e.g., HomePNA version 2.0). For instance, in isolated HomePNA networks with HomePNA version 1.0 (V1) terminals, the link integrity signaling is transmitted in V1-defined physical signaling parameters. This physical signaling mode is not consistent with later generation network devices (e.g., HomePNA version 2.0 (V2) terminals). Both systems, however, employ and implement data-based link integrity signaling.

If the environment is a mixed network and the D3 power down state is FALSE (based on step 204) then the process flows to step 206.

If the D3 cold state is to be entered, the process flow is via step 214. Referring to step 214 of FIG. 3, a D3 cold state is entered with link integrity maintained through the hardware link integrity module 100, rather than through the software link integrity module 110 in core memory 104.

In step 216, it is determined whether or not legacy devices exist on the network, requiring alternate type link integrity (e.g., version 1.0 HomePNA). If so, link integrity including legacy signaling capability is enabled (step 220) while disabling packet based version 2.0 HomePNA link integrity signaling (step 218). Otherwise, the hardware based version 2.0 HomePNA link integrity signaling is enabled (step 222) and the legacy supporting link integrity is disabled (step 224).

Figure 4:
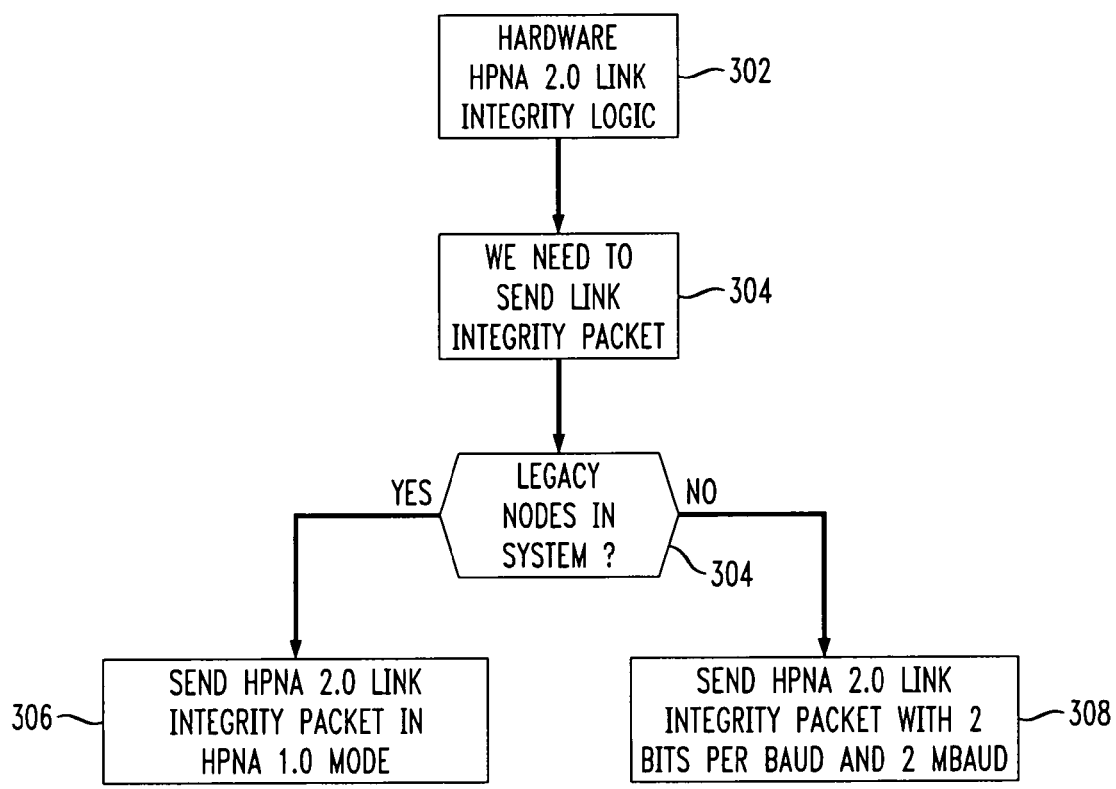
FIG. 4 is an exemplary transmitter behavior state flow diagram showing backwards compatibility with a physically unique electrical signal based link integrity system (e.g., HomePNA version 1.0) in a network device implementing data-based link integrity (e.g., HomePNA version 2.0), in accordance with the principles of the present invention.
Figure 5:
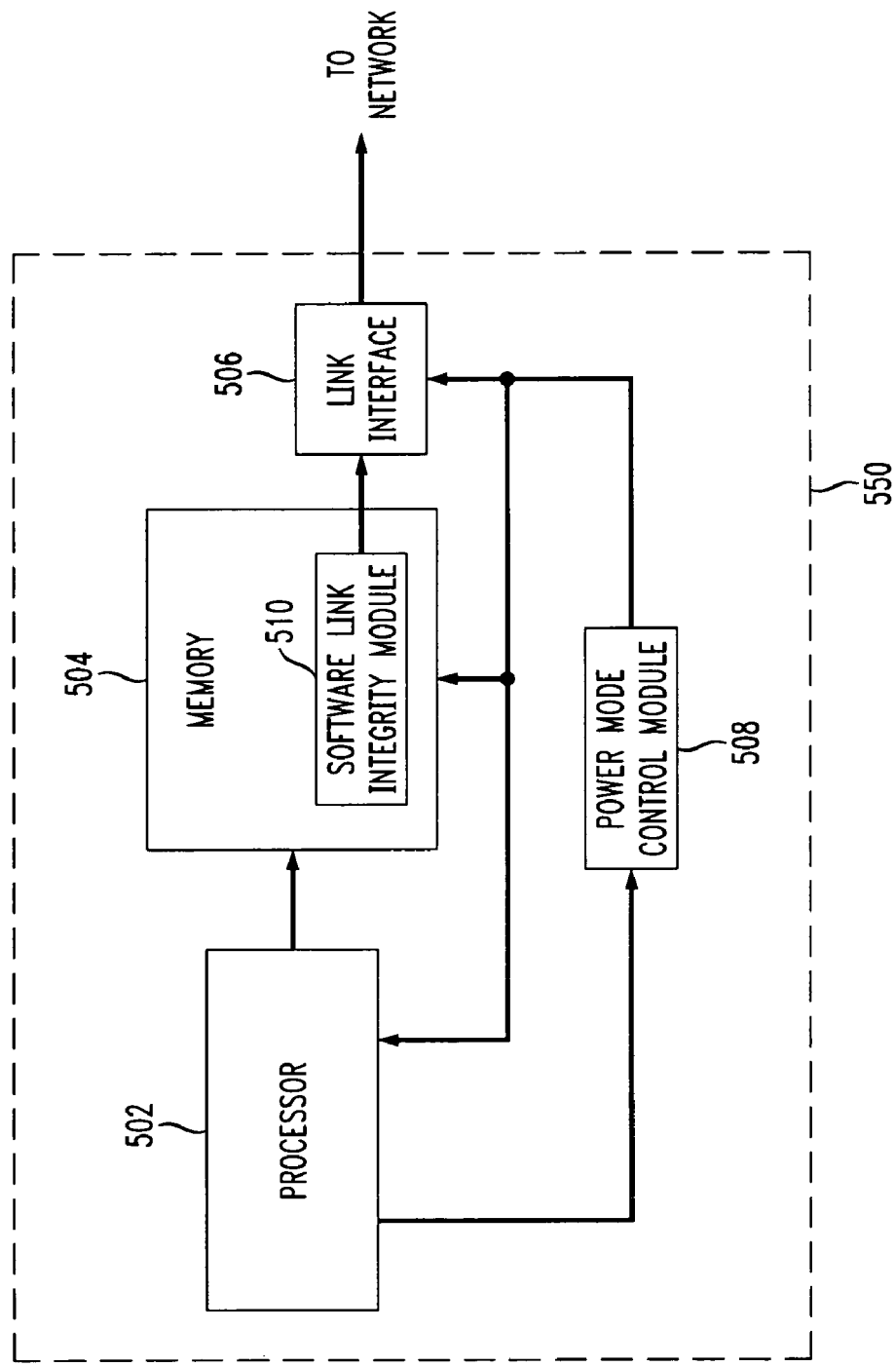
FIG. 5 shows a conventional data-based link integrity module incorporated within core memory of a network device, in accordance with the principles of the present invention.

Link integrity generation and special state handling is considered in FIG. 4, which is an exemplary transmitter behavior state flow diagram showing backwards compatibility with a physically unique electrical signal based link integrity system (e.g., HomePNA version 1.0) in a network device implementing data-based link integrity (e.g., HomePNA version 2.0), in accordance with the principles of the present invention.

In particular, as shown in step 302 of FIG. 4, logic in the hardware link integrity module 100 determines whether or not link integrity information is to be transmitted. If the device is inactive, link integrity information should be transmitted to indicate to other network devices that the relevant network device is still present.

Step 302 also looks to see if any legacy network devices exist in the network (e.g., HomePNA version 1.0 devices). If so, as determined in step 304, then the data-based link integrity signaling packet is preferably transmitted using a form including physical integrity signaling, so that both physical link integrity and a relevant link integrity data packet are transmitted, as shown in step 306. If not, then only data-based link integrity packet information need be transmitted, as shown in step 308.

Alternatively, to provide compatibility with network devices utilizing only physical link integrity signaling (e.g., as in HomePNA version 1.0), a physical based link integrity pulse may always be transmitted to other network devices regardless of the current system power state.

While the invention has been described with reference to the exemplary preferred embodiments thereof, those skilled in the art will be able to make various modifications to the described embodiments of the invention without departing from the true spirit and scope of the invention.

What is claimed is:

1. A network device, comprising:
   a core processor and core memory; and
   a link integrity module in communication with said core processor, said link integrity module being powered separately from said core processor and said core memory;
   said network device including a D3 type cold power mode wherein said link integrity module maintains power;
   wherein said network device is selected from the group consisting of
   a HomePNA device,
   a BLUETOOTH device,
   a Homeplug device,
   a wired device,
   a power line device, and
   a wireless device.

2. The network device according to claim 1, wherein:
   in said D3 type cold power mode, said network device removes power from said core memory.

3. The network device according to claim 1, wherein:
   in said D3 type cold power mode, said network device removes power from said core processor.

4. The network device according to claim 1, further comprising:
   a network interface.

5. The network device according to claim 1, wherein:
   said network device is a HomePNA device.

6. The network device according to claim 1, wherein:
   said network device is a BLUETOOTH device.

7. The network device according to claim 1, wherein:
   said network device is a Homeplug device.

8. The network device according to claim 1, wherein:
   said network device is a wired device.

9. The network device according to claim 8, wherein said wired device is one of:
   a HomePNA device; and
   a G.989.1 compliant device.

10. The network device according to claim 1, wherein:
    said network device is a power line device.

11. The network device according to claim 10, wherein:
    said power line device is a Home Plug device.

12. The network device according to claim 1, wherein:
    said network device is a wireless device.

13. The network device according to claim 12, wherein said wireless device is one of:
    a HomeRF device; and
    a IEEE 802.11 compliant device.

14. The network device according to claim 1, wherein:
    said wireless device is an optical communications network device.

15. The network device according to claim 14, wherein:
    said optical communications network device is an Infrared device.

16. A method of maintaining data-based link integrity in a powered down network device, comprising:
    providing a link integrity module powered separately from core functionality in said network device; and
    removing power from said core functionality of said network device while maintaining power to said separately powered link integrity module wherein said network device is selected from the group consisting of
    a HomePNA device,
    a BLUETOOTH device, and
    a Homeplug device.

17. The method of providing data-based link integrity in a powered down mode according to claim 16, wherein:
said network device is a HomePNA device.

18. The method of providing data-based link integrity in a powered down mode according to claim 16, wherein:
said network device is a BLUETOOTH device.

19. The method of providing data-based link integrity in a powered down mode according to claim 16, wherein:
said network device is a Homeplug device.

20. Apparatus for maintaining data-based link integrity in a powered down network device, comprising:
means for providing a link integrity module powered separately from core functionality in said network device; and
means for removing power from said core functionality of said network device while maintaining power to said separately powered link integrity module;
wherein said network device is selected from the group consisting of
a HomePNA device,
a BLUETOOTH device, and
a Homeplug device.

21. The apparatus for providing data-based link integrity in a powered down mode according to claim 20, wherein:
said network device is a HomePNA device.

22. The apparatus for providing data-based link integrity in a powered down mode according to claim 20, wherein:
said network device is a BLUETOOTH device.

23. The apparatus for providing data-based link integrity in a powered down mode according to claim 20, wherein:
said network device is a Homeplug device.

* * * * *